_United States Patent Office_ 3,689,466
Patented Sept. 5, 1972

3,689,466
SULFONATED POLYMERIC ALCOHOLS
Douglas J. Bridgeford, Champaign, and Albin F. Turbak and Noel I. Burke, Danville, Ill., assignors to Tee-Pak, Inc., Chicago, Ill.
No Drawing. Filed Sept. 9, 1969, Ser. No. 856,455
Int. Cl. C08b 3/00, 9/00; C08f 27/06
U.S. Cl. 260—79.3 R          24 Claims

ABSTRACT OF THE DISCLOSURE

Polymeric alcohol derivatives consisting of polymeric alcohol sulfonic acids containing S-xanthogenate ester substituents of the general formula

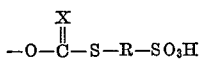

and salts of said polymeric alcohol sulfonic acids prepared by reaction of a sultone, e.g., 1,3-propane sultone, with the free acid form or a salt of a polymeric alcohol xanthogenate ester, e.g., cellulose xanthate. The novel omega-sulfonated polymeric alcohol derivatives have physical and chemical properties, e.g., solubility, viscosity, reactivity with cross-linking agents, and an anionic character, adapting them for advantageous use in a wide range of applications. The derivatives fine particular utility as anti-static and anti-soiling agents which are effective when applied to a wide range of soil receptive substrates, e.g., natural and synthetic textiles.

DISCLOSURE OF THE INVENTION

This invention relates to novel sulfonated derivatives of polymeric alcohols and, more particularly, to S-xanthogenate esters which are the reaction products of sultones with the free acids and salts of polymeric alcohol xanthogenate esters. The invention further relates to the use of such polymeric alcohol sulfonic acids and sulfonates to provide anti-static and soil repellent coatings on soil receptive substrates.

BACKGROUND OF THE INVENTION

Sultones are cyclic esters of hydroxysulfonic acids. Such compounds are recognized in the prior art to be reactive with compounds containing nucleophilic functional groups to introduce a sulfonic acid moiety. The versatility of the reactivity of sultones has led to their use in the production of compounds having widely varied physical and chemical properties. Reactions of sultones with alcohols, thiols, phenols, amines, amides, mercaptans, carboxylic acids, thio acids, and phosphorous-containing compounds, for example, have been known to produce derivatives useful as detergents, wetting agents, suspending agents, bactericides, fungicides, and sizing agents. However, while the versatility of sultones has led to the preparation of interesting derivatives in the laboratory, the relatively high cost of sultones in comparison with alternative sulfonation agents generally has limited their commercial use.

The problems stemming from the surface soiling of shaped articles are well recognized. In fabrics used for wearing apparel and other textile products, such as carpeting and upholstery, surface soiling not only is unattractive and usually shortens the life of the fabric but often presents difficulties to proper hygiene maintenance.

To combat soiling problems, numerous approaches have been suggested in the prior art. In general, attempts to render substrates soil repellent and/or soil releasable have involved an impregnation or coating of the substrate with a compound having itself some degree of one or both of these properties. Additives and coating agents which have been suggested in the main are polymeric compounds which range from strongly hydrophobic materials such as fluorinated polymers to more hydrophilic polymers containing carboxylic, phosphoric, and/or sulfonic acid functionality. Compounds previously suggested, while successful in providing protection to various substrates against certain types of soiling, generally have not been totally satisfactory in imparting soil resistance to even specific substrates against widely varying types of soil contaminants. In other instances, where impregnating or coating agents provide resistance against soiling by relatively widely varying types of soiling agents, the additives may still be of limited utility due to an inability to resist removal from the substrate when the substrate is subjected to the mechanical (e.g., scuffing) or chemical (e.g., washing) operations it normally incurs. The permanence of an anti-soilant on a substrate can be improved, in some instances, by chemically bonding the anti-soiling agent directly or through cross-linking agents to the substrate. This approach, however, also has had its drawbacks mainly due to the chemical bonding interfering with or destroying other desired characteristics of the substrate itself or other additives, e.g., permanent press additives on fabrics.

Accordingly, a search has continued in the art for alternative agents capable of imparting improved anti-static, soil repellent and/or soil release properties to shaped materials, such as textiles and the like.

OBJECTS OF THE INVENTION

The primary object of the present invention is to provide a novel class of sulfonated polymeric alcohol derivatives.

Another object of the present invention is to provide sulfonated polymeric alcohol derivatives which are easily prepared from available starting materials and which have valuable properties.

An additional object of the present invention is to provide novel sulfonated polymeric alcohol derivatives which are stable and water-soluble.

A further object of the present invention is to provide sulfonated polymeric alcohol derivatives which are stable and are soluble in water to form aqueous solutions relatively insensitive to metal ions and organic solvents.

Still another object of the present invention is to provide sulfonated polymeric alcohol derivatives which form relatively viscous, stable, aqueous solutions.

Yet a further object of the present invention is to provide sulfonated polymeric alcohol derivatives which easily can be applied to or formed in situ on substrates to impart anti-static, soil repellent, and/or soil releasability thereto.

Another object of the present invention is to provide sulfonated polymeric alcohol derivatives which can be used alone or in combination with cross-linking agents to produce anti-static, soil repellent, and/or soil releasable coatings on soil receptive substrate surfaces.

An additional object of the present invention is to provide sulfonated polymeric alcohol derivatives which can be applied to soil receptive substrate surfaces to impart anti-static, soil repellent, and/or soil release properties effective against a wide range of soilants.

A further object of the present invention is to provide sulfonated polymeric alcohol derivatives which can be used to impart anti-static, soil repellent, and/or soil release properties to a wide range of soil receptive substrates.

Particular objects of the present invention are to provide sulfonated derivatives of polymeric alcohols, such as cellulose and starch, having as features the properties set forth in the aforementioned objects.

Other particular objects of the present invention are to provide treated shaped articles, such as natural and synthetic textile articles, to which improved anti-static, soil repellent and/or soil release properties have been imparted.

DETAILED DESCRIPTION OF THE INVENTION

It has been found that the properties described in the aforementioned objects are characteristics of a novel class of compounds consisting of polymeric alcohol derivatives selected from the group consisting of (a) polymeric alcohol sulfonic acids containing S-xanthogenate ester substituents of the general formula

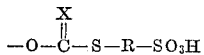

wherein X is oxygen or sulfur and R is a divalent hydrocarbon radical selected from the group consisting of linear alkylene radicals of 3–6 carbon atoms and said linear alkylene radicals containing lower alkyl substituents, and (b) total and partial salts of said polymeric alcohol sulfonic acids.

The polymeric alcohol sulfonates of the present invention include water-soluble and water-insoluble embodiments. The sulfonated derivatives of the invention further embrace both straight S-xanthogenate esters of polymeric alcohols, mixed esters of polymeric alcohols which contain, in addition to S-xanthogenate ester substituents of the above type, unesterified xanthogenate ester substituents and/or mixed ester ethers containing, in addition to such ester substituents, alkyl sulfonate ether substituents containing alkylene radicals —R— of the type described above.

Typically, the polymeric alcohol sulfonates of the present invention have a degree of substitution (D.S.) with regard to all (i.e., including both sulfonic acid- and sulfonate salt-terminated) S-xanthogenate ester substituents in the range of from about 0.001 to about 1.0, and more usually in the range of from about 0.01 to about 0.5, and a molecular weight of at least about 1,000 and ranging up to about 5,000,000. More usually, the molecular weight is in the range of from about 2,000 to about 500,000. Embodiments of typical sulfonated derivatives of the invention which are mixed esters and mixed ester ethers, in addition to such molecular weight and S-xanthogenate ester substituent D.S. characteristics, further usually have a D.S. with regard to all unesterified xanthogenate ester substituents and a D.S. with regard to all alkyl sulfonate ether substituents each of which is less than about 50%, more usually less than about 10%, of the S-xanthogenate ester substituents D.S. of the derivative. The phrase "degree of substitution," as used herein, is intended to refer to the ratio which expresses the average number of a given substituent in a polymeric alcohol derivative to the total number of available hydroxyl groups per 100 monomeric units in the derivative. A straight cellulose S-xanthogenate ester derivative having an average of one S-xanthogenate sulfonic acid ester substituent per 100 monomeric units, therefore, has a degree of substitution (D.S.) with regard to S-xanthogenate ester substituents of 0.0033. A polyvinyl alcohol derivative containing an average of one S-xanthogenate sulfonic acid ester substituent per 100 monomeric units, on the other hand, has a D.S. of 0.01 with regard to such substituents.

The sulfonated polymeric alcohol derivatives of the present invention are derived from the reaction products of sultones of the formula

wherein R is as defined above, with polymeric alcohol xanthogenate esters, i.e., the acid and salt forms of the reaction products of carbon disulfide, carbonyl sulfide, or mixtures thereof with polymeric alcohols. The sultones react with the xanthogenate ester substituents in the starting polymeric alcohol derivatives to provide S-xanthogenate ester substituents of the above-defined type.

In the preparation of the sulfonated polymeric alcohol derivatives of the present invention, S-xanthogenate ester substituent introduction may be effected in one or more stages using either a polymeric alcohol xanthogenate ester which initially contains sufficient xanthogenate ester substituents to produce the desired S-xanthogenate ester substituent-containing derivative or one which requires further xanthogenation, intermediate a reaction of the derivative with sultones, to provide the desired degree of total available xanthogenate ester moiety.

Polymeric alcohol xanthogenate esters useful as starting materials in the present invention, accordingly, vary widely. Polymeric alcohol xanthogenate esters are known materials and constitute a well recognized class of compounds. Detailed procedures for preparing such compounds including free acids and various salts thereof are disclosed, for example, in U.S. Pats. Nos. 3,291,789, 3,330,820, 3,336,114, and 3,399,069. Carbon disulfide-derived polymeric alcohol xanthogenic acids and salts (sometimes commonly referred to as "xanthates") are relatively stable and, if conditions are properly controlled, i.e., in the absence or substantial absence of competing nucleophiles, react rapidly and essentially quantitatively with sultones. Xanthates of polymeric alcohols constitute a broad class of compounds preferred for use in preparing sulfonated polymeric alcohol derivatives of the invention. Less preferred for use in preparing sulfonated polymeric alcohol derivatives of the invention are carbonyl sulfide-derived polymeric alcohol xanthogenate esters since such compounds are relatively unstable and decompose rapidly when formed. By carrying out the synthesis thereof in the presence of a sultone, however, the carbonyl sulfide-derived xanthogenate esters can be employed as intermediates in the preparation of relatively stable sulfonated polymeric alcohol derivatives.

Examples of specific polymeric alcohol xanthogenate ester intermediates used in the preparation of the sulfonated polymeric alcohol derivatives of the invention include water-soluble and water-insoluble xanthogenic acids and xanthogenate salts of polysaccharides of the formula $(C_6H_{10}O_5)_x$ such as cellulose, starch, amylose, amylopectin, dextran, and glycogen; other natural hydrocolloidal polysaccharides such as gum arabic, gum tragacanth, carob-seed gum, agar-agar, algin; glucosamine polysaccharides such as chitin and chitosan; hydrolyzed forms of such polysaccharides such as alkali cellulose and acid-hydrolyzed cellulose, starch, and chitin; and other polymeric alcohols including addition polymers such as polyvinyl alcohol, polyvinyl alcohol/polyvinyl ester copolymers, e.g., polyvinyl alcohol/polyvinyl acetate and polyvinyl alcohol/polyvinyl propionate, and condensation polymers such as hydroxy-methylated nylons; as well as various other modified (e.g., oxidized) or derivatized (e.g., etherified, such as hydroxyethylated and hydroxypropylated, and esterified, such as acetylated and propylated) forms of such polymeric alcohols, provided such products contain hydroxyl groups reactive with carbon disulfide or carbonyl sulfide (e.g., contain "xanthatable" hydroxyl groups).

Examples of polymeric alcohol xanthogenic acid salts used in the preparation of sulfonated polymeric alcohol derivatives of the invention include water-soluble and water-insoluble inorganic and organic salts of the above-specified polymeric alcohol xanthogenic acids such as the ammonium, alkali metal, e.g., sodium and potassium; alkaline earth metal, e.g., calcium, magnesium, barium, zinc and strontium; heavy metal, e.g., aluminum, cadmium, iron, copper, chromium and zirconium; amine, e.g., trimethylamine and pyridine; quaternary ammonium, e.g., benzyltrimethyl ammonium; and imine, e.g., ethyleneimine and polyethyleneimine salts of the afore-described xanthogenic acids.

Certain polymeric alcohol xanthogenate esters are especially useful in the preparation of S-xanthogenate ester sulfonated polymeric alcohol derivatives in accordance with the present invention. As the xanthogenate ester D.S. of a polymeric alcohol increases, for example, the water solubility of it and the S-xanthogenate esters, which can be formed by it, generally increases. Where it is desired to effect reaction of the sultone with the polymeric alcohol xanthogenate ester in solution, or where the resultant S-xanthogenate ester is desired to be water-soluble, the xanthogenate reactant preferably has a sufficiently high D.S. with regard to xanthogenate ester substituents to be water-soluble and impart water-solubility to the S-xanthogenate esters produced. For polymeric alcohol xanthogenate esters having a molecular weight of less than about 200,000, for example, a minimum xanthogenate ester D.S. in the ester reactant in the range of from about 0.005 to about 0.15 usually is sufficient to impart adequate water-solubility and viscosity properties to the free acid, ammonium, and alkali metal salt forms of the resultant S-xanthogenate esters of corresponding D.S. produced therefrom. Soluble S-xanthogenate esters produced in accordance with the present invention, and in particular the cellulose xanthate-S-alkane sulfonates, produce solutions which are considerably more viscous than the xanthogenate ethers of comparable D.S. from which they are prepared. Indeed, a feature of the present invention is that the xanthogenate esters of the present invention display viscosities which attain surprisingly high levels in comparison to viscosities characteristic of other polymers, including sulfonated polymers, of equivalent molecular weight and functionality. An S-xanthogenate ester, accordingly, while soluble, normally may vary from a gel in water, for example, and form pourable solutions only at undesirably low concentrations, e.g., below 0.5%. In instances where soluble S-xanthogenate esters are desired, the D.S. of the xanthogenate ether reactant employed in the preparation thereof may also be preferred to be sufficiently high to produce sulfonated derivatives which are capable of forming solutions of minimum concentrations, e.g., about 2%.

The molecular weight of the starting polymeric alcohol xanthogenate esters is also important to the production of preferred S-xanthogenate esters of the invention. At lower molecular weights, e.g., those below about 25,000, polymeric alcohol xanthogenate esters produce the more soluble S-xanthogenate ester derivatives. The more preferred sulfonated derivatives of the present invention are produced using polymeric alcohol xanthogenate esters of a sufficiently high molecular weight, e.g., above about 50,000, to render the ultimate S-xanthogenate esters film-forming. Particular examples of such preferred film-forming sulfonates are the water-soluble S-xanthogenate esters derived from cellulose xanthates having a degree of polymerization (D.P.) of at least about 100 and in the range from about 150 to about 550. Film-forming sulfonate derivatives formed from polymeric alcohol xanthogenate esters of the higher molecular weights, e.g., cellulose xanthates of molecular weights above about 100,000 and xanthates of the hydrocolloidal polysaccharides, such as dextran, of molecular weights above about 300,000 are less soluble. Accordingly, the sulfonated derivatives produced from such higher molecular weight polymeric alcohol xanthogenates may not produce solutions which, for example, are easily coatable on substrates. Highly useful S-xanthogenate ester derivatives, on the other hand, can be produced from such high molecular weight xanthogenate esters in situ on substrates upon which coatings of the sulfonate derivatives are desired.

As described in U.S. Pats. Nos. 3,291,789, 3,330,820, 3,336,114, and 3,399,069, the conventional technique for preparing polymeric alcohol xanthogenates involves a reaction of a polymeric alcohol with carbon disulfide, carbonyl sulfide, or a mixture thereof at a pH in excess of 13 and produces resultant xanthogenates containing significant amounts of excess caustic and by-product sulfur compounds including thio-, dithio-, and trithiocarbonic acid salts. Alkalis and thio acids, such as those present as contaminants in conventionally prepared polymeric alcohol xanthogenates, are reactive with sultone. The preferred polymeric alcohol xanthogenates for use in preparing sulfonated derivatives of the invention, accordingly, are those which have been at least decausticized to a pH below about 13 and more preferably below about 12. The more preferred polymeric alcohol xanthogenates are those, which in addition to being decausticized, are substantially free of xanthogenation sulfur by-products. Decausticizing of such materials may be carried out by treatment with weak acids, solvent extraction, or as described in U.S. 3,291,789, by treatment of solutions or suspensions of crude polymeric alcohol xanthogenates with cation exchangers, anion exchangers, combinations of cation and anion exchangers, ion retardation resins, and membranes such as dialysis membranes which are permselective with regard to the caustic. Certain of such treatments, i.e., the use of anion exchangers, ion retardation resins, and permselective membranes are also effective to remove sulfur by-products. Alternatively, removal of xanthogenation by-product sulfur contaminants may be effected, as shown in U.S. 3,399,069, by spray drying a previously decausticized polymeric alcohol xanthogenate.

Specific examples of sultones suitable for use in the preparation of the sulfonated polymeric alcohol derivatives of the present invention include 1,3-propane sultone, 1,4-butane sultone, 1,5-pentane sultone, and the lower alkyl substituted derivatives thereof such as 2,2-dimethyl-1,3-propane sultone, 2,2-diethyl-1,3-propane sultone, 2,2-dipropyl-1,3-propane sultone, 2,3-dimethyl-1,3-propane sultone, 1,2,3-trimethyl-1,3-propane sultone, 2,2-dimethyl-1,4-butane sultone, and mixtures of isomeric butane sultones (prepared from mixtures of chlorobutane sulfonic acids which are obtained by sulfochlorination of 1-chlorobutane). The preferred sultones are the gamma-sultones and, more particularly, 1,3-propane sultone.

In accordance with the present invention, the sultone can be reacted with the polymeric alcohol xanthogenic acid or xanthogenic acid salt intermediate in a number of ways, the preferred technique depending primarily upon the nature of the polymeric alcohol xanthogenate intermediate. In general, the reaction can be carried out with the polymeric alcohol intermediate in the form of a solid, a gel, or a solution or suspension in an aqueous or organic liquid medium. In any system utilized, the system preferably is free of compounds having anions (other than hydroxyl ions) which compete with the xanthogenate for the sultone.

In certain preferred embodiments, the polymeric alcohol xanthogenate is reacted with the sultone in the form of an aqueous or organic solvent xanthogenate solution. Such embodiments have the advantage of proceding rapidly. In other preferred embodiments, the polymeric alcohol xanthogenate is suspended in a suitable liquid for reaction with the sultone. Such embodiments have the advantage in allowing for ease of recovery of the sulfonated derivative produced. In instances wherein suspensions of the xanthogenates are utilized, however, it may be, and often is, desirable to incorporate into the system water or other hydrophilic liquids which swell the polymeric alcohol xanthate to allow for uniformity of conversion and to increase speed of reaction.

Although water is reactive with sultones, it may be used in reaction systems employed in the present invention since the sultone-water reaction is significantly faster than the sultone-water reaction. Indeed, the ease and efficiency with which sultones react with polymeric alcohol xanthogenates to produce the sulfonated polymeric alcohol derivatives of the invention is a particularly advantageous feature of the invention. Relatively high hydroxyl ion concentrations, however, may give rise to undesirable losses of the relatively expensive sultone reactant. The presence of excess amounts of caustic in water or other ionizable reaction media should be avoided. When such systems are employed, highly acid conditions at the initiation of the reaction also should be avoided to avoid regeneration of the polymeric alcohol.

In preparing the sulfonated derivatives of the present invention, sufficient total amounts of the sultone reactant is added to the system to effect the desired degree of conversion of xanthogenate ester substituents in the polymeric alcohol xanthogenate ester reactant to S-xanthogenate ester substituents. The addition and/or consumption of sultone reactant in amounts corresponding to mole ratios of sultone to xanthogenate ester substituents of less than 1:1 result in mixed S-xanthogenate esters containing unesterified xanthogenate ester substituents. In general, sultone addition and the S-xanthogenate esterification reaction is controlled to esterifying with sultone at least 50%, and preferably at least 90%, of the xanthogenate ester substituents. More preferred S-xanthogenate esters are produced by providing sultone to the reaction in amounts sufficient to convert essentially all xanthogenate ester substituents in the polymeric alcohol derivative reactant to S-xanthogenate ester substituents. Where the polymeric alcohol xanthate ester reactant contains free hydroxyl groups, sultone in amounts corresponding to mole ratios of sultone to xanthogenate ester substituents in excess of 1:1 may be added and a portion of the excess consumed in a sultone-ether reaction, provided the pH is sufficiently high at some time of reaction to favor ether formation. Such reaction products are mixed S-xanthogenate ester derivatives containing alkyl sulfonate ether substituents, the latter resulting from the reaction of the sultone with hydroxyls of the polymeric alcohol derivative. In general, such excess sultone reaction with the polymeric alcohol xanthogenate ester intermediates is controlled to maintain the D.S. of alkyl sulfonate ether substituents introduced into the S-xanthogenate esters produced at levels which are less than about 50%, and more usually less than about 10% of the S-xanthogenate ester substituent D.S. of the derivatives.

The manner of sultone addition to the sultone-xanthogenate ether reaction may vary.

The total amount of sultone to be reacted may be added batchwise. Batch addition of the sultone may be advantageous, for example, in instances wherein the xanthogenate ester employed in the reaction is produced in situ by a reaction in the system of a polymeric alcohol and carbonyl sulfide or a carbonyl sulfide/carbon disulfide mixture. Alternatively, sultone addition can be carried out in increments in an intermittent or continuous manner. Incremental addition may be preferred, for example, in instances wherein the slower reacting but competing anion contributing compounds, such as water, are present in the reaction system.

The resultant polymeric alcohol S-xanthogenate esters produced by the reaction of sultones with the polymeric alcohol xanthogenate esters, depending upon the nature thereof and ultimate use contemplated therefor, then may be utilized as such or subjected to a further treatment. Further treatments contemplated for use include contacting the S-xanthogenate ester derivative with an acid, base, salt, cation-exchanger and the like to partially or totally alter the nature of the cations thereof. The sulfonic acid forms of the S-xanthogenate esters of the invention are significantly more stable than the corresponding salts. Where the sulfonated derivatives are produced as salts and the materials are to be stored, they preferably are converted to the free acid form by a suitable technique, such as by contact with a strong acid cation ion exchanger in the hydrogen ion form and the like. Other treatments contemplated to be carried out on polymeric alcohol S-xanthogenate esters produced in the invention, especially in cases where coatings thereof are formed on substrates by deposition or in situ formation, include an application of heat and/or reaction of the S-xanthogenate ester derivatives with cross-linking agents, alkaline earth or heavy metal compounds or other substances such as polymeric bases, e.g., polyethylene imine, which effect insolubilization or further insolubilize the resultant sulfonated derivative.

The sulfonated derivatives of the present invention have valuable properties, those particularly obtaining depending upon the given sulfonate derivative. As a general rule, the sulfonate derivatives of the invention have properties which enable them to impart to substrates upon which they are deposited varying degrees of anti-static, soil repellent, and soil release properties. Embodiments that are water-soluble form solutions which are relatively viscous, and display stability toward salts and organic liquids. The lower molecular weight sulfonate derivatives, e.g., of a molecular weight below about 1000, produce relatively easily soluble coatings which, however, do produce a protective effect due to scaffolding. The protective effect moreover can be improved by providing the derivatives in the form of heavy metal salts or reacting them with cross-linking agents after deposition on the substrate.

The higher molecular weight polymeric alcohol sulfonate derivatives of the invention and, in particular, film-forming embodiments thereof, e.g., having a molecular weight above about 25,000, constitute especially advantageous anti-static, soil repellent, and soil release agents. Protection provided substrates on which such sulfonate derivatives are deposited advantageously extends to a wide range of both hydrophilic and organophilic soiling agents. Certain embodiments of such film-forming sulfonated derivatives, e.g. the cellulose-S-xanthate ester sulfonates, display superior soilant protection even after repeated attempts to remove the sulfonated derivatives by washing. This effect is observed even though the cellulose-S-xanthate ester sulfonates themselves are water-soluble and the use of heavy metal salts, cross-linking agents and other insolubilizing agents is omitted, although such insolubilizing expedients are contemplated, and indeed preferred, for use.

The sulfonated polymeric alcohol derivatives of the invention are effective for use in providing anti-static, soil repellent, and/or soil release coatings on a wide range of soil receptive substrate materials. The sulfonated polymeric alcohol derivatives of the present invention find effective use, for example, as coatings on hydrophilic and hydrophobic natural and synthetic substrates such as textiles (e.g., filaments, fibers, yarns, and woven and nonwoven fabrics), films, and other shaped or molded articles formed of glass; metals, such as aluminum, copper, and iron; ceramics; cellulosic materials, such as cotton, rayon, and paper; proteinaceous materials, such as wool and silk; polyesters, such as polyethylene glycol terephthalate, e.g., Dacron; polyamides, such as nylons; polyurethanes; and polymers of olefinically unsaturated compounds, such as polyacrylonitrile, e.g., Orlon and Dacron, polyvinyl chloride, polyvinylidene chloride, polyvinyl alcohol, polyvinyl acetate, polymethyl methacrylate, polyethylene, polypropylene, and polystyrene.

Deposits of the sulfonated derivatives of the invention on substrate surfaces can be effected by various ways. Usually, the desired deposition of an S-xanthogenate ester derivative is accomplished by initially applying to the substrate surface desired to be covered a coating of an aqueous or organic solvent solution or dispersion of the S-xanthogenate ester and subsequently treating the coated substrate to remove the solvent liquid from the coating. Application of the S-xanthogenate ester solution or dispersion in such methods may be carried out by any available coating technique which provides suitably uniform coatings including those utilizing a spraying of the solution or dispersion, immersion of the substrate in a bath of the solution or dispersion, or a transfer of the solution or dispersion from a bath thereof to the substrate by a conventional mechanical transfer coater such as those having rolls, pads, and the like. Removal of the solvent liquid from the resultant coated substrates may be carried out by evaporation or contacting the coated substrate with a coagulation bath. Alternatively, deposition of an S-xanthogenate ester on a substrate can be carried out by forming the S-xanthogenate ester derivative in situ on the substrate surface. In such embodiments, for example, a coating of a polymeric alcohol xanthogenate ester initially may be applied to the substrate in the manner described above with regard to S-xanthogenate ester derivatives. The deposited xanthogenate ester then may be contacted with a sultone to produce the desired S-xanthogenate ester derivative in situ on the substrate surface.

The amount of sulfonated derivative deposited on a substrate in particular embodiments varies depending on the nature of the particular sulfonate derivative utilized, the substrate being treated, and the degree and duration of protection desired or practical under the circumstances. In the treatment of textiles according to the present invention, for example, the polymeric alcohol S-xanthogenate ester derivatives of the present invention typically are deposited as substantially uniform coatings on the textiles in total amounts falling in the range of from about 0.005 to about 5% by weight of the textile.

Although coatings of the polymeric alcohol S-xanthogenate ester derivatives of the present invention produced as described above are effective, without further treatment, to impart anti-static, soil repellent, and soil release properties to substrates on which they are applied, these and other properties, such as the adherence of the coatings to the substrate, can be improved by providing, in the ultimate coatings, one of the more highly insolubilized forms of the S-xanthogenate ester derivatives. Insolubilized forms of the S-xanthogenate esters of the present invention can be produced by heat treating the S-xanthogenate esters at temperatures in excess of about 100° C., e.g., in the range of from about 110° C. to about 180° C., for suitable periods, reacting the S-xanthogenate esters with cross-linking agents, and/or, where they are not already in such form due to a previous intermediate treatment or an in situ formation thereof, converting the ester derivatives to heavy metal salts. Reactants for insolubilizing the S-xanthogenate esters such as crosslinking agents and heavy metal compounds may be incorporated into solutions or dispersions originally applied to the substrates and become activated and react with the S-xanthogenate esters during or after subsequent drying or curing treatment. Alternatively, such insolubilizing reactants can be incorporated into a bath or spray which contacts a previously deposited wet or dry S-xanthogenate ester coated substrate. That heating can be employed to provide insolubilized deposits of the S-xanthogenate esters which retain sulfonate substituents and substantially all of the original anti-static, soil repellent, and soil release properties of the unheated coatings is a particularly valuable and important feature of the present invention.

Cross-linking agents suitable for use in insolubilizing coatings of S-xanthogenate esters of the invention are any compounds containing two or more functional groups reactive with hydroxyl groups and include diisocyanates, such as 1,4-toluene diisocyanate; aldehydes such as formaldehyde and glutaraldehyde; polymethylol derivatives such as water-soluble urea-formaldehyde condensation products and trimethylol melamine; and epoxides such as butadiene diepoxide. Typical heavy metal compounds useful in converting S-xanthogenate esters to insolubilized form include water-soluble inorganic and organic bases and salts such as the water-soluble hydroxides, chlorides, nitrates, sulfates, acetates, citrates, and the like of multivalent heavy metals and transition metals such as aluminum, zinc, iron, chromium, and zicronium. Alkaline earth metals are generally ineffective to insolubilize soluble esters. Indeed, a feature of the present invention is that the solutions of S-xanthogenate esters of the invention are surprisingly tolerable to an addition of alkaline earth metal salts.

Supplemental agents also may be combined with the S-xanthogenate ester derivatives of the present invention in providing improved coatings on substrates such as textiles. Such supplemental additives suitably may include conventional anti-soiling agents such as polyacrylic acid, sodium polystyrene sulfonates, extenders, e.g., film-forming polymers such as cellulose xanthates, starch xanthates, starch, and polyvniyl alcohol, as well as conventional coating adjuvants such as pigments, dyes, optical promoters, and plasticizers.

In accordance with the present invention, especially valuable coating materials for soil receptive substrates, and particularly for textiles, have been found to be constituted by film coatings formed from mixtures of water-soluble film-forming polyvinyl alcohols and water-soluble film-forming S-xanthate ester cellulose derivatives of the invention in the form of either free sulfonic acids or alkali metal salts, e.g., cellulose xanthate-S-propane sulfonic acids and cellulose xanthate S-propane-sodium sulfonates. Embodiments of such mixtures typically contain up to about 200 parts of the polyvinyl alcohol resin per 100 parts by weight of the cellulose S-xanthogenate ester derivative. With or without cross-linking or metal salt treatment, these mixtures can be applied as water solutions to a wide range of natural and synthetic fabrics and dried to provide coatings theereon which have surprising resistance to removal by water, aqueous detergent solutions, and conventional organic solvents and display excellent soil resistance and soil releasability to both hydrophilic and organophilic soiling agents.

The invention having been described in detail, the following examples are given to illustrate specific embodiments of the polymeric alcohol S-xanthogenate esters of the present invention and uses thereof. It will be understood that the examples are given for illustration purposes and not by way of limitation.

EXAMPLE 1

This example illustrates a cellulose xanthate-S-propane sulfonic acid derivative of the present invention.

15.5 grams of a cellulose xanthate having a xanthate ester substituent D.S. of about 0.16 (xanthate sulfur content of about 19.6%, dry cellulose basis) and a D.P. of about 200 and prepared by spray-drying a viscose of comparable D.P. decausticized to a pH of about 9.0 with a strong acid cation-exchange resin in the hydrogen ion form (Dowex 50–H) is dissolved in 1421 grams of water at 4° C. To the resultant solution are added about 3.8 grams of propane sultone. The resultant mixture is allowed to react for about 2.5 hours. At the end of this period, the temperature of the reaction medium has risen to about 16° C. This solution is then allowed to further react overnight in a refrigerator. An analysis carried out on the resultant product produced indicates the product contains about 0.5% xanthate sulfur or that about 97% of the xanthate substituents in the cellulose xanthate reactant have been converted to xanthate-S-propane-sulfonate substituents. Quantitative conversion of the sultone reacted to S-propane-sulfonate derivatives is verified by contacting one half of the product solution until equilibrium is reached with first an anion exchange resin in the hydroxyl ion form (Amberlite IRH–400) and then a cation exchange resin in the hydrogen ion form (Dowex 50–H) and titrating the ion-exchanged material with sodium hydroxide.

The other half of the product solution produced is diluted with about 600 ml. of water, then acidified with 10% hydrochloric acid, and then sodium chloride is added to salt-out the sulfonated product. The resultant precipitate is filtered, washed with methanol, refiltered, and then dried under vacuum. The resultant product is a nearly white powder which redissolves easily in water at 2% concentration to yield solutions having a pH of about 3. Tests carried out at intervals on samples of the powdery product and the solutions formed thereby reveal the materials are essentially stable over periods of several months.

EXAMPLE 2

This example illustrates another embodiment of the cellulose xanthate S-propane sulfonate derivatives of the invention.

About 20 grams of a cellulose xanthate having a xanthate ester D.S. of about 0.06 (xanthate sulfur content of about 8.4%, dry cellulose basis) and a D.P. of about 415 obtained by spray drying a viscose of comparable D.P. decausticized to a pH of about 10 with a strong acid cation-exchange resin in the hydrogen ion form (Dowex 50–H) is dissolved in 500 ml. of water at about room temperature, about 4.5 grams of propane sultone are added, and the reaction is allowed to proceed. In about three minutes, the solution gels. At the end of two hours total reaction time, a resultant gel of cellulose xanthate-S-propane sulfonate is formed and can be diluted with water to give 1% clear, gel-free solutions. Analysis reveals substantially complete conversion of xanthate substituents to xanthate-S-propane sulfonate substituents.

EXAMPLES 3–5

These examples illustrate additional embodiments of the cellulose xanthate-S-propane sulfonate derivatives of the invention.

20 grams of three cellulose xanthate products having a D.P. of about 515 and xanthate ester substituent degrees of substitution of about 0.04, 0.09, and 0.13, respectively, and obtained by spray drying viscoses decausticized to a pH of 9–10 are dissolved separately in 1000 ml. of water and to the respective solutions, 3 grams, 6 grams, and 8 grams of propane sultone are added. The mixtures are allowed to react at room temperature for two hours, after which time conversion of xanthate ester substituents in the derivatives to xanthate-S-propane sulfonate substituents is essentially complete and all reaction mixtures are in the form of gels. The gels are then diluted to samples of either 0.5% or 1.0% concentration and the Brookfield viscosities of the resultant mixtures are measured at 24–26° C. The results of the measurements are shown in Table 1 below.

TABLE 1

| Cellulose S-propane-sulfonate derivative sample | | Brookfield viscometer operation | | Measured Brookfield viscosity, cps. |
|---|---|---|---|---|
| D.S. | Conc., percent | Spindle | R.p.m. | |
| 0.04 | 1.0 | 3 | 6 | 2,500 |
| 0.09 | 0.5 | 1 | 60 | 39 |
| 0.09 | 1.0 | 2 | 12 | 2,450 |
| 0.13 | 0.5 | 1 | 60 | 30 |
| 0.13 | 1.0 | 2 | 60 | 1,750 |

EXAMPLE 6

This example illustrates a further embodiment of the cellulose xanthate-S-propane sulfonate derivatives of the invention.

About 4 parts of cellulose xanthate product having a xanthate ester substituent D.S. of about 0.20 (xanthate sulfur content of about 25%, dry cellulose basis) and a D.P. of about 375 and obtained by spray drying a viscose decausticized to a pH of about 9.5 is dissolved in 125 parts water and to the resultant solution about 1.8 parts of propane sultone are added. The resultant mixture is held at 13° C. with stirring for 1.5 hours and then is heated to 22° C., at which temperature the system gels after 15 minutes. The mixture is allowed to further react for four hours at room temperature and then is stored overnight at 4° C. Analysis reveals the xanthate substituents of the resultant cellulose derivative essentially all are in the form of xanthate-S-propane sulfonate substituents. The solid sulfonic acid form of the derivative is recovered by acidifying the gel product with 10% sulfuric acid, adding eight parts sodium chloride to the acidified system, and then filtering, methanol washing, and drying the resulting precipitate.

EXAMPLE 7

This example illustrates a starch xanthate-S-propane sulfonate derivative of the invention.

About 70 grams of a starch xanthate product having a xanthate ester substituent D.S. of about 0.04 (xanthate sulfur content of about 5.7%, dry starch basis) and obtained by spray-drying an acetic acid-neutralized pearl starch xanthate are dissolved in 1000 ml. of water at 25° C. About 7.2 grams of propane sultone are added over a period of 1.25 hours to the solution and allowed to react with the starch xanthate. At the end of this period, a readily pourable product solution is obtained in which analysis reveals, substantially all original xanthate ester substituents of the starch derivative are converted to xanthate-S-propane sulfonate substituents.

EXAMPLE 8

This example illustrates an embodiment of an amylose xanthate-S-propane sulfonate derivative of the invention.

About 20 grams of an amylose xanthate product having a xanthate ester substituent D.S. of about 0.07 and a D.P. of about 500 and prepared in accordance with the procedure of Example 3 of U.S. Pat. No. 3,399,069 by spray-drying starch xanthate decausticized by dialysis is dissolved in 500 ml. of water and 6 grams of propane sultone are added to the solution, the mixture is allowed to react at 25° C. for two hours. The resultant product is an amylose xanthate derivative having a xanthate-S-propane sulfonate substituent D.S. comparable to the xanthate ester D.S. of the starting amylose reactant.

EXAMPLE 9

This example illustrates an embodiment of a polyvinyl alcohol xanthate-S-propane sulfonate derivative of the invention.

About 20 grams of a polyvinyl alcohol xanthate product having a xanthate ester D.S. of about 0.3 and a D.P. of about 1000 and produced in accordance with the procedure of Example 4 of U.S. Pat. No. 3,399,069 by spray-drying polyvinyl alcohol xanthate decausticized by dialysis are dissolved in 500 ml. of water. 10 grams of propane sultone are then added and the resultant mixture allowed to react at 25° C. for two hours. Analysis of the product which is recoverable from the resultant solution using the acidification and salting-out and techniques of the above examples reveals it is a polyvinyl alcohol xanthate-S-propane sulfonic acid having a D.S. of S-xanthate ester substituents comparable to the starting polyvinyl alcohol xanthate ester derivative.

EXAMPLE 10

This example illustrates an embodiment of a chitin-xanthate-S-propane sulfonate.

A sample of industrial grade chitin is ground to −60 mesh and 26 grams of the resultant material held in 300 ml. of concentrated (50%) sodium hydroxide overnight in a refrigerator. The resultant mixture is centrifuged and a slush obtained which is diluted with water and recentrifuged. The alkali chitin centrifugate obtained is transferred to a closed bottle. About 100 grams of carbon disulfide then are added and the resultant contents reacted at 28° C. for two hours while the bottle is slowly rotated. During the reaction the initially ivory colored chitin shifts to yellow-orange. About 150 ml. of water are then added and the slurry is refrigerated at about 0.5° C. for two days. The resultant solution obtained is diluted to 1000 ml. to provide a solution containing about 2.6% chitin. About 550 ml. of the solution is diluted with one liter of water, and, with blending, glacial acetic acid is added to bring the pH to 6. The combination of the blending and acidification effects a removal of a major portion of the by-product originally present. After sodium hydroxide pellets are added to a sodium hydroxide concentration in the chitin xanthate solution of 3%, about 11 grams of propane sultone dispersed in 300 ml. of water are added. The resultant mixture is allowed to react at about 36° C. for about 16 hours. About 400 ml. of the resultant product solution then are combined with a mixture of 50 grams sodium chloride and 50 ml. aqueous 10% hydrochloric acid in 1000 ml. methanol. Centrifuging of the resultant mixture yielded a chitin-xanthate-S-propane sulfonic acid product having a S-xanthate ester D.S. of about 0.21 and a molecular weight of about 500,000.

EXAMPLE 11

This example illustrates embodiments of the polymeric alcohol xanthate-S-propane sulfonate derivatives which are salts other than sodium salts.

A series of stainless steel columns are charged with a strong cation exchange resin (Dowex 50WX8) in the hydrogen ion form. The cation exchange resins then separately are converted to the ammonium, potassium, calcium, barium, cadmium, aluminum, trimethylamine, pyridine, and benzyltrimethylammonium salt forms by treatment with 5% aqueous solutions of ammonia, potassium hydroxide, calcium chloride, barium chloride, cadmium nitrate, aluminum nitrate, trimethylamine, pyridine, and benzyltrimethylammonium hydroxide, respectively. Through each column is then passed 0.25% aqueous solutions of the cellulose xanthate-S-propane-sulfonic acid product produced in Example 1 by treatment of the derivative with anion and cation exchange resins.

The resultant solutions obtained are stable solutions or dispersions of the ammonium, potassium, calcium, barium, cadmium, aluminum, trimethylamine, pyridine and benzyltrimethylammonium, salts, respectively, of cellulose xanthate-S-propane sulfonic acid.

Repeating the procedure to contact in the columns each, in turn, 0.25% aqueous solutions of starch xanthate-S-propane sulfonic acid, amylose xanthate-S-propane sulfonic acid, and polyvinyl alcohol xanthate-S-propane sulfonic acid derivatives, obtained by subjecting the starch, amylose, and polyvinyl alcohol sulfonate derivatives of Examples 7, 8, and 9, respectively, to the anion exchange resin-cation exchange resin treatment of Example 1, results in stable solutions of similar salts of the starch, amylose, and polyvinyl alcohol xanthate-S-propane sulfonic acids.

Films of the salt solutions are placed on glass and allowed to air dry at room temperatures. Certain of the resultant dried salts, i.e., the cadmium and aluminum salts could not be redissolved in water. The remaining dried salts redissolved.

EXAMPLE 12

This example illustrates embodiments of other cellulose xanthate-S-alkane-sulfonate derivatives of the invention.

The procedure of Example 1 is repeated except that each 1,4-butane sultone, 1,5-butane sultone, 2,2-dimethyl-1,3-propane sultone, 2,2-diethyl-1,3-propane sultone, 1,2,3-trimethyl propane sultone, and isomeric mixtures of butane sultones are substituted in equimolar amounts for the 1,3-propane sultone utilized.

The resultant products produced are cellulose xanthate-S-alkane sulfonate derivatives containing an alkylene group in the sulfonate product corresponding to the alkylene group of the sultone reactant and having a D.S. with regard to xanthate-S-alkane sulfonate substituents of about 0.16.

EXAMPLE 13

This example illustrates the preparation of a polymeric alcohol xanthate-S-alkane sulfonate derivative by reaction of a sultone with a polymeric alcohol xanthate suspended in an organic liquid reaction medium.

About 100 grams of a crude sodium cellulose xanthate crumb in which the cellulose has a xanthate ether substituent D.S. of about 0.16 (xanthate sulfur content of about 20%, dry cellulose basis) is slurried in a mixture of 500 ml. of isopropanol, 200 ml. water, and 19 ml. of acetic acid diluted to 50 ml. with isopropanol. About 12.4 grams of propane sultone are added, and the resultant slurry mixture is allowed to react at 25° C. for about 16 hours. The resultant product produced is easily soluble in water at 1% concentrations. Analysis reveals the cellulose product has a xanthate-S-propane sulfonate substituent D.S. substantially the same as the xanthate D.S. of the starting xanthate crumb.

EXAMPLE 14

This example illustrates the preparation of polymeric alcohol S-xanthogenate esters of the present invention by reacting a sultone with polymeric alcohol xanthogenate esters formed in situ.

About 20 grams of sodium cellulose (D.P. about 250), 2 grams of carbon disulfide, 2.3 grams of propane sultone are added to a Sigma blade mixer and allowed to react at about 25° C. with mixing for 45 minutes. The resultant product is dissolved in water at a 0.9% concentration and subjected to treatment with an anion exchange resin and a cation exchange resin as in Example 1. The product thereby formed is a cellulose xanthate-S-propane sulfonic acid derivative.

EXAMPLE 15

This example illustrates further embodiments of the preparation of polymeric alcohol S-xanthogenate esters of the invention by reacting a sultone with in situ formed polymeric alcohol xanthogenate esters.

The procedure of Example 14 is repeated for two runs except that the reaction is carried out at about 0° C. for six hours, (a) in one run, carbonyl sulfide additionally is metered into the mixer at a constant rate of about 2 cubic liters per hour, and (b) in the other, carbon disulfide is omitted and carbonyl sulfide is metered into the mixer at a constant rate of about 4 cubic liters per hour.

The resultant products are both found to be water-soluble cellulose-S-xanthogenate ester derivatives.

The properties of the polymeric alcohol S-xanthogenate esters of the invention advantageously adapt then for a wide range of uses. The following examples illustrate certain applications of the S-xanthogenate derivatives.

EXAMPLE 16

This example illustrates the use of the S-xanthogenate esters of the invention as coating agents which impart soil repellent and soil release properties to a polyester substrate.

In this example, a 1% aqueous solution of a cellulose xanthate-S-propane sodium sulfonate having a D.P. of about 375 and a xanthate-S-propane sulfonate substituent D.S. of about 0.20 and prepared as in Example 6 is employed. This solution is applied by immersion and padding to 10 in. x 8 in. pieces of a polyester fabric (formed of polyethylene glycol terephthalate fibers marketed by Eastman Kodak Company under the trademark "Kodel IV") and the resultant coated fabrics are dried at 105° C. for about 15 minutes. The resultant sulfonated polymer addons are substantially uniform coatings on the fabrics in total amounts corresponding to 0.5–0.7% by weight of the polyester fabrics.

Several coated samples are tested to determine the durability of the sulfonated polymer coatings. In these tests, one sample, after drying at about 100° C., is immediately washed with water at 60° C. and the amount of sulfonate retained then is determined by conventional staining techniques using methylene blue. In another test, a sample of the coated polyester fabric is enclosed in a bottle along with water and held therein at 60° C. for extended periods. At intervals, a portion of the fabric is removed from the bottle and the retention of the sulfonated coating thereon is tested by methylene blue staining. These tests revealed that the coating provided the dried cellulose xanthate-S-propane sodium sulfonate is essentially totally resistant to removal by simple washing and retains its sulfonate functionality even after six months storage in damp, humid environments.

To test the anti-soiling properties of the coating produced by the sulfonated cellulose derivative, other samples of the coated fabric separately are initially soiled with a deposit of one of crankcase oil, motor oil, French dressing, mustard, chocolate, and lipstick, washed in an aqueous solution of a household detergent, and then examined to determine objectively the degree of success the coated fabric enjoys in repelling the various soilants. Parallel soiling and washing tests are conducted on uncoated samples of the polyester fabrics and serve as controls. The soiling tests reveal that, while the control displays essentially no resistance to stains by the soilants, the sulfonate derivative-coated polyester fabrics, even after three washings, are resistant to soiling by the motor oil, French dressing, mustard, and chocolate. The tests further show that treated fabric is soil resistant to lipstick stains through two washings and show some improvement, as compared to the control, in regard to resisting staining by crankcase oil.

EXAMPLE 17

Example 16 is repeated except that 0.1% of a diisocyanate cross-linking agent (diisocyanate derived from 36-carbon dimerized aliphatic acids and marketed by General Mills, Inc. as "DDI diisocyanate") is added to the cellulose xanthate-S-propane sulfonate coating solution and the drying of treated fabrics is carried out at 140° C. for 10 minutes to allow the diisocyanate to cross-link sulfonated derivatives coating.

The resultant polyester fabric produced have slightly more adherent sulfonated derivative coatings show and evidence anti-soiling properties similar to the treated fabrics of Example 16.

EXAMPLE 18

Example 16 is repeated except that after application of the cellulose xanthate-S-xanthate sulfonate solution, the resultant fabric is immersed in a 5% aqueous solution of zirconium chloride, washed in tap water, and then dried at about 105° C.

The resultant zirconium sulfonate salt coating on the treated fabric shows greater durability than the coating of Example 16 but somewhat poorer anti-soiling characteristics. The anti-soiling properties of the zirconium salt treated fabrics, however, still are significantly improved as compared to the control.

EXAMPLE 19

Example 16 is repeated except that the cellulose xanthate-S-propane sulfonate utilized is the sulfonic acid form of the cellulose xanthate-S-propane sulfonate of Example 6, the sulfonic acid derivative being obtained by subjecting that sulfonate derivative to cation exchange as in Example 1.

The resultant coatings of the sulfonic acid derivative on the polyester fabrics are found to give improved anti-soil properties to the fabrics compared to those of the coatings of the treated fabrics of the preceding examples. The sulfonic acid derivative coatings, however, are less durable.

Immersing a sample of the sulfonic acid-treated fabric in a 5% aqueous solution of polyethyleneimine (Tydex 12, Dow Chemical Company) and drying the treated fabric is found to improve coating durability with a slight sacrifice to anti-soil properties.

EXAMPLE 20

This example illustrates the treatment of cotton-polyester fabrics in accordance with the present invention to improve the anti-soiling properties thereof.

The general procedure of Example 16 is repeated to apply coatings to a fabric of a 65:35 blend of Kodel polyester-cotton which has been treated with a formaldehyde derivative to impart a permanent press finish on the fabric In this example, the coating solution is a 0.5% aqueous solution of the sulfonic acid form of the cellulose xanthate-S-propane sulfonate of Example 2, the sulfonic acid derivative being obtained by contacting that sulfonate with a strong acid cation exchange resin (Dowex 50–H) in the hydrogen ion form. The addon of sulfonated derivative in the resultant dried coated fabric is about 0.1–0.2% by weight of the fabric.

The resultant coatings of the sulfonic acid derivative on the polyester-cotton fabric are found to be more durable and to give improved anti-soiling properties to the treated fabric comparable to the best coatings of the preceding examples. The coatings are even soil repellent to the crankcase oil soilant.

EXAMPLE 21

The procedure of Example 20 is repeated except that in the coating solution used is a 1% aqueous solution of the cellulose-S-propane sulfonic acid of Example 6 to provide coatings representing addons of about 0.25%, based on the fabric.

The resultant coatings are found to be durable and impart soil repellent properties to the treated fabrics comparable to those of the treated fabrics of Example 16.

EXAMPLE 22

The procedure of Example 21 is repeated except that about 0.1% DDI diisocyanate, based on the sulfonated derivative, is added to the sulfonate derivative solution used to coat the polyester-cotton fabric and the solution coated fabrics are heated at about 140° C. to cure and cross-link the sulfonate derivative coating.

The sulfonate coatings in the resultant treated fabrics have excellent durability and soil repellent properties similar to those of the treated fabrics of Example 16.

EXAMPLE 23

The procedure of Example 20 is repeated except that the permanent press treatment of the starting polyester cotton fabric is omitted, the concentration of the sulfonic acid derivative in the coating solution is about 0.5%, and about 1.5% of a dihydroxyl dimethylol cyclic ethylene urea (Permafresh 183BT solids) a conventional fabric durable-press finish additive and about 0.075% zinc nitrate, a catalyst for the durable-press additive, are added to the sulfonate derivative coating solution. The coating solution is applied at a liquid pickup by the fabric of about 120% and the solution-coated fabrics are dried at about 105° C. to avoid curing the sensitized resin additive. The dried fabrics then are pressed with an iron at a linen setting to place a crease therein and cure the resin in the creased fabric. The coating of the resultant creased fabrics then are tested for durability and soil repellent properties as in Example 16 and the durability of the creases therein is noted.

The resultant treated fabrics are found to be durable sulfonate derivative coatings having soil repellent properties slightly reduced from those of the treated fabrics of Example 16 and to have durable press characteristics equivalent to the control fabrics produced using coating solutions from which the cellulose sulfonic acid derivative is omitted.

EXAMPLE 24

The procedure of Example 20 is repeated to produce a series of treated polyester-cotton fabrics except that, in the preparation of the sulfonate derivative coating solutions utilized, the sulfonate derivative employed is the sodium salt of the cellulose xanthate-S-propane sulfonate derivative of Example 2 and each 10, 50, and 100 parts of each polyvinyl alcohol, polyacrylic acid, carboxymethylcellulose, polyvinyl-pyrrolidone, and spray dried decausticized cellulose xanthate, separately are added per 100 parts of the sulfonic acid derivative.

The resultant treated fabrics produced in each case have coatings of excellent durability and soil-repellent properties similar to those of the treated fabrics of Example 20.

EXAMPLE 25

The procedure of Example 24 is repeated except that 0.1% of DDI diisocyanate is added to each coating solution, and the solution-coated fabrics are dried to about 140° C. to allow the diisocyanate to cure and cross-link the polymers in the coating.

The resultant treated fabrics, in each case, have excellent durability and soil-repellent properties comparable to those of the treated fabrics of Example 20.

EXAMPLE 26

The procedure of Example 20 is repeated except that the coating solution utilized is 2.8% aqueous solution of the sulfonic acid form of the starch-xanthate-S-propane sulfonate of Example 7, the sulfonic acid derivative being obtained by subjecting the sulfonate salt form to a cation exchange treatment as in Example 16. To the starch sulfonic acid derivative-containing coating is added 0.28% DDI diisocyanate. The solution-coated polyester-cotton fabrics are dried at about 140° C. to cure and cross-link the sulfonated polymers in the coatings. The coatings produced correspond to an addon of about 1.0–1.5% by weight of the fabrics.

The resultant treated fabrics show soil-repellent properties which are improved as compared to control fabrics, but slightly poorer than those of the treated fabrics of Example 20.

EXAMPLE 27

This example illustrates the treatment of additional fabrics in accordance with the present invention.

The procedure of Example 17 is repeated to produce an additional series of treated fabrics except that a cotton muslin fabric, a wool 11 oz. flannel fabric, and a nylon fabric, each in turn, is substituted for the polyester fabric.

The coatings of 0.5–0.75% addon on the resultant treated fabrics are found to be durable and have improved soil-repellent properties comparable to those of the treated polyester fabric of Example 17.

In addition to being useful as anti-soiling agents on fabrics and other soil-receptive substrates, the sulfonated derivatives of the invention also find utility in other applications by virtue of the advantageous properties thereof.

EXAMPLE 28

Solutions of the sulfonated polymeric alcohol derivatives of the invention produced as described above typically have relative high viscosities. Aqueous solutions (e.g., 0.1–4%) of cellulose xanthate-S-propane sulfonates of the invention, for example, surprisingly display viscosities ranging up to 100 times those of similar concentrations of other polymers such as carboxy-methylcellulose of corresponding molecular weight. Thus the sulfonated derivatives of the invention are excellently suited as thickening agents and as suspending agents in systems containing inorganic and polymeric materials including fibers, pigments such as titanium dioxide, polymers such as polyacrylic acids, polyvinyl alcohol, polyvinyl acetate and the like.

EXAMPLE 29

An aqueous solution of a polymeric alcohol xanthogenate ester is produced as described in any of the various processes above. This solution is used as a binder for pigments (e.g., carbon black and aluminum powder) and dyes such as Anthran Yellow G (C.I. 19020) and Orange 11 (C.I. 15510) in ink formulations. The inks have excellent properties (non-toxic) and are strongly resistant to rubbing and scratching.

EXAMPLE 30

An aqueous solution of a polymeric alcohol xanthogenate ester is prepared by any of the various methods described above. This solution is used to apply a sizing coating to a textile such as cotton. The sized cotton produced has a substantially crisper feel than control pieces.

EXAMPLE 31

Solutions of polymeric alcohol S-xanthogenate esters prepared as described above can be mixed with other polymeric materials to produce composite articles. Carboxymethylcellulose, amylose, polyvinyl alcohol, polyacrylic acid, and the like can be kept in a fine state of dispersion in such solutions. Such dispersions are effective to produce novel composite articles (e.g., films, fibers, etc.).

EXAMPLE 32

Solutions of polymeric alcohol S-xanthogenate esters prepared as described above can be used as binders which are heat-curable to improve adhesion between films, fibers, woven fabrics, nonwoven fabrics and sheets, formed of such materials as wood, paper, regenerated cellulose, cellulose, acetate, cotton, wool, nylon, Dacron, oxidized polyethylene, and the like.

What is claimed is:

1. A compound consisting of a polymeric alcohol derivative selected from the group consisting of (a) polymeric alcohol sulfonic acids containing S-xanthogenate ester substituents of the general formula

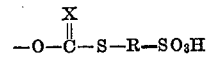

wherein X is oxygen or sulfur and R is a divalent hydrocarbon radical selected from the group consisting of linear alkylene radicals of 3–6 carbon atoms and said linear alkylene radicals containing lower alkyl substituents, and (b) total and partial salts of said polymeric alcohol sulfonic acids.

2. A polymeric alcohol sulfonate derivative according to claim 1 having a degree of substitution with regard to said S-xanthogenate ester substituents in the range of from about 0.001 to about 1.0 and having a molecular weight in the range of from about 1,000 to about 5,000,000.

3. A polymeric alcohol sulfonate derivative according to claim 2 wherein X is sulfur.

4. A polymeric alcohol sulfonate derivative according to claim 3 wherein —R— is —CH$_2$CH$_2$CH$_2$—.

5. A polymeric alcohol sulfonate derivative according to claim 3 wherein said polymeric alcohol is a polysaccharide.

6. A sulfonated starch-, polyvinyl alcohol-, chitin-, or chitosan derivative according to claim 3.

7. A film-forming polymeric alcohol sulfonate derivative according to claim 3.

8. A water-soluble polymeric alcohol sulfonic acid according to claim 3.

9. A water-soluble polymeric alcohol sulfonate salt according to claim 3.

10. A water-insoluble polymeric alcohol sulfonate derivative according to claim 3.

11. A water-insoluble polymeric alcohol sulfonate derivative according to claim 10 comprising a multivalent metal salt of said polymeric alcohol sulfonic acids.

12. A water-insoluble polymeric alcohol sulfonate derivative according to claim 10 comprising a cross-linked derivative of said polymeric alcohol sulfonic acids and sulfonate acid salts.

13. A water-soluble polymeric alcohol sulfonic acid according to claim 2 having a molecular weight of at least about 25,000 and wherein X is sulfur.

14. A water-soluble starch-, polyvinyl alcohol-, chitin-, or chitosan xanthate-S-propane sulfonic acid according to claim 13.

15. A water-soluble polymeric alcohol sulfonate salt according to claim 2 having a molecular weight of at least about 25,000 and wherein X is sulfur.

16. A water-soluble starch-, polyvinyl alcohol-, chitin-, or chitosan xanthate-S-propane sulfonate salt according to claim 15.

17. A water-soluble polymeric alcohol alkali metal sulfonate salt according to claim 15.

18. A water-soluble starch-, polyvinyl alcohol-, chitin-, or chitosan xanthate-S-propane-alkali metal sulfonate according to claim 15.

19. A compound consisting of a cellulose derivative selected from the group consisting of (a) cellulose sulfonic acids containing S-xanthogenate ester substituents of the general formula

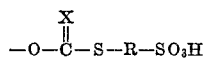

wherein X is oxygen or sulfur and R is a divalent hydrocarbon radical selected from the group consisting of linear alkylene radicals of 3-6 carbon atoms and said linear alkylene radicals containing lower alkyl substituents, and (b) total and partial salts of said polymeric alcohol sulfonic acids.

20. A cellulose sulfonate derivative according to claim 19 having a degree of substitution with regard to said S-xanthogenate ester substituents in the range of from about 0.001 to about 1.0 and having a molecular weight in the range of from about 1,000 to about 5,000,000.

21. A cellulose sulfonate derivative according to claim 20 wherein X is sulfur.

22. A water-soluble cellulose sulfonic acid according to claim 20 having a molecular weight of at least about 25,000 and wherein X is sulfur.

23. A water-soluble cellulose sulfonate salt according to claim 20 having a molecular weight of at least about 25,000 and wherein X is sulfur.

24. A water-soluble cellulose xanthate-S-propane-alkali metal sulfonate according to claim 23.

References Cited
UNITED STATES PATENTS

| | | | |
|---|---|---|---|
| 2,523,977 | 9/1950 | Wagner | 252—8.5 |
| 3,213,053 | 10/1965 | Kendrick, Jr. | 260—29.6 |
| 3,357,971 | 12/1967 | Klug | 260—215 |
| 3,475,364 | 10/1969 | Trapasso | 260—32.6 |

JOSEPH L. SCHOFER, Primary Examiner

C. A. HENDERSON, JR., Assistant Examiner

U.S. Cl. X.R.

117—139.5 C, 139.5 A; 260—78 SC, 91.3 VA, 209 R, 209 D, 211 R, 216 R, 218, DIG. 17 and 19